C. E. HOLAWAY.
SPRING FRAME FOR MOTOR AND OTHER CYCLES.
APPLICATION FILED MAR. 24, 1911.
1,003,908.
Patented Sept. 19, 1911.
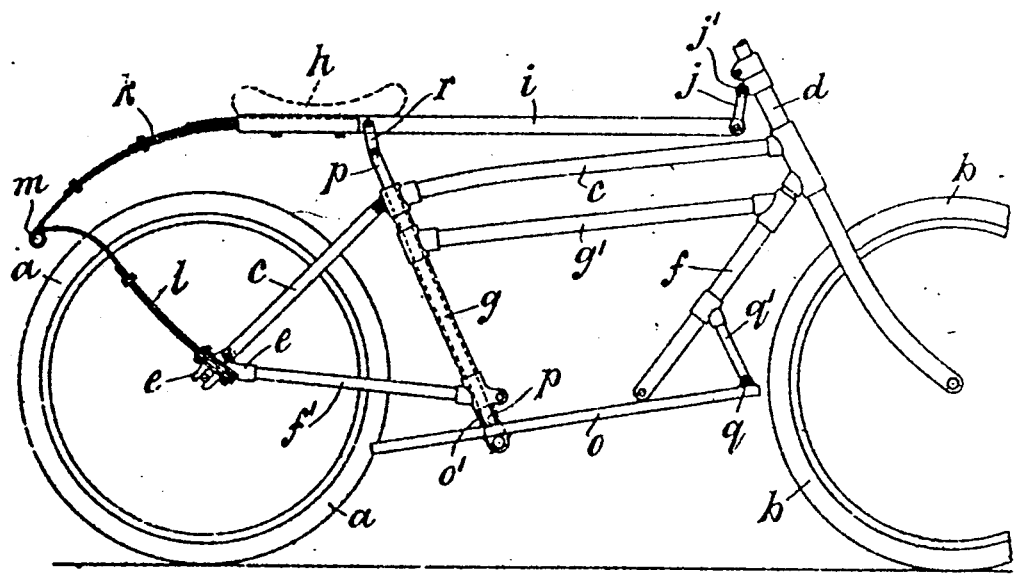
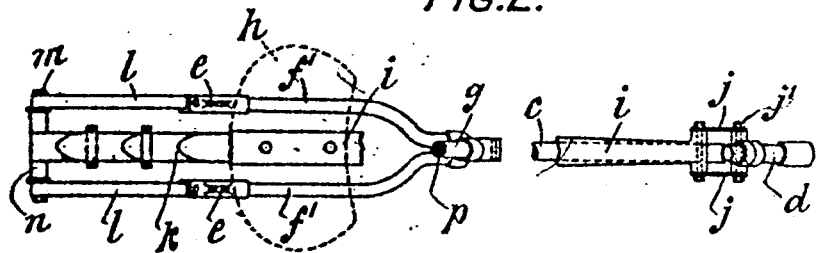

1,003,908. SPRING-FRAME FOR MOTOR AND OTHER CYCLES. CHARLES EDMUND HOLAWAY, Chester, England. Filed Mar. 24, 1911. Serial No. 616,616.

*To all whom it may concern:*

Be it known that I, CHARLES EDMUND HOLAWAY, a subject of the King of England, residing at the city of Chester, in the county of Cheshire, England, have invented certain new and useful Improvements in Spring-Frames for Motor and other Cycles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has reference to cycle, and more particularly motor cycle frames of the spring type; and it has for its object and effect to provide an improved construction of frame of this kind, and the seat carrying portions of such frames and parts which work in connection with it.

In the following description of cycle frame, which is made in connection with the accompanying drawings, the improvements hereunder are comprised.

In the drawings, Figure 1 is a side elevation of a motor bicycle frame constructed according to the invention; and Fig. 2 is a plan of it.

Referring to the drawings, $a$ and $b$ represent the rear and front wheels of the machine; and $c$ is the upper rigid frame member connecting the head $d$ of the frame of the cycle, with the back axle supports or brackets $e$; while $f$ and $f^1$ are respectively the lower members of the frame, connecting the back axle supports or brackets $e$, and the head $d$, with the engine or motor frame in the known way; that is the inner ends of these members will be coupled up and connected with the motor portion of the bicycle. Between the rigid member $c$, and the inner end of the member $f^1$, there is a tubular member $g$, which rigidly connects these parts together; and this inclined member or tube $g$ is also coupled up with the fore tubular member $f$ by the connection or tube $g^1$.

In the cycle, the seat $h$ is carried upon an upper rigid member $i$, which is movable, and at the front end is connected to links $j$, carried from a rigid portion of the frame— in the case shown—the head $d$, by a swivel or pin joint at $j^1$.

At, and attached to the back end of the seat member $l$—which in itself is rigid—is a plate spring $k$ in the form of a half bow; and from the rear wheel axle carrying portions or brackets $e$, there are two plate springs $l$, one on each side, projecting upward and backward; and the outer ends of these springs $l$ and $k$ are connected up by a pin joint $m$, and the pin, and spring ends, may have ball bearings in them, with the usual cups and cones, at $n$, so that while the connection is firm, the movement between these parts will be free, and the joints will work with very little friction.

So far as the seat carrying member $i$ is concerned, when the load is on it, and the machine receives vertical motion in running over an uneven surface, the springs $k$ and $l$ at the rear of the seat, will tend to move together, and the member $i$ will also move backward somewhat.

The foot rests $o$ of machine, which in the case shown are boards, one on either side of the frame, are mounted at the front ends by joints $q$ on the lower end of members $q^1$ carried from the member $f$; and at the back portion they are connected with and carried from the lower part of a member or tube $p$, which passes through the frame tube $g$, which serves as a guide to it; and the upper end of which is connected by a link $r$, to the underside of the saddle or seat member $i$, and near to the saddle. This member $p$ therefore can move up and down with the member $i$ through the tube $g$; but as regards lateral movement, it prevents this, and so steadies the whole saddle or seat carrying members and frame work, and renders it firm as regards the lateral position and movement, and so prevents lateral swaying of the seat or saddle and its carrying member $i$.

Between the tube $g$ and the foot rests $o$, a spring $o^1$ may be introduced; or a spring may lie between the inner and outer tubes, and extend for the greater part of the length of the tube $p$ which connects the seat to the foot rests; the object and effect of the spring being to give ease and elasticity to the vertical movement of the inner connecting tube or seat, as well as providing a steadying action.

I claim—

1. An improved frame for cycles, comprising in combination a rigid seat carrying member at the upper part carried at its front end by the front portion of the cycle frame; a plate spring as $k$, projecting out from the back end of the rigid member; and plate springs as $l$, connected to the frame near the rear wheel axle, and projecting backward and upward, and a movable joint device connecting the outer ends of these springs together; substantially as set forth.

2. A cycle frame comprising a rigid portion including a head, a tubular member and a bearing, a bar located above the frame, a pivoted link pivoted to the head and the bar, a flat spring extending from the rear of the bar, a flat spring rigidly secured to the bearing and extending upwardly and rearwardly therefrom, a pivotal connection between the two flat springs, a seat secured to the bar, a rod slidably mounted in the tube and a link pivoted to the bar and the slidable rod.

3. A cycle frame comprising a rigid portion including a head, a tubular member and a bearing, a bar located above the frame, a pivoted link pivoted to the head and the bar, a flat spring extending from the rear of the bar, a flat spring rigidly secured to the bearing and extending upwardly and rearwardly therefrom, a pivotal connection between the two flat springs, a seat secured to the bar, a rod slidably mounted in the tube, a link pivoted to the bar and the slidable rod, a foot rest pivoted to each side of the rigid portion of the frame, a pivotal connection between the rod and the foot rests and a spring interposed between the foot rests and the rigid portion of the frame.

4. A cycle frame comprising a rigid portion including a head, a tubular member and a bearing, a bar located above the machine, means for mounting the bar on the head and bearing including pivotally mounted flat springs, a rod slidably mounted in the tubular member, a link pivoted to the bar and the rod, a foot rest under the stationary portion of the frame, a pivotal connection between the foot rest and the rigid portion of the frame, a pivotal connection between the rod and the foot rest, and a spring interposed between the foot rest and the stationary portion of the frame.

In testimony whereof I have signed my name to this specification in the presence of two subscribing witnesses.

CHARLES EDMUND HOLAWAY.

Witnesses:
  SYDNEY HERBERT HOLAWAY,
  SOMERVILLE GOODALL.